United States Patent
Sylvester, II (10) Patent No.: US 12,074,474 B1
(45) Date of Patent: *Aug. 27, 2024

(54) SHIELD GENERATOR

(71) Applicant: Michael S. Sylvester, II, Falmouth, ME (US)

(72) Inventor: Michael S. Sylvester, II, Falmouth, ME (US)

(*) Notice: Subject to any disclaimer, the term of this patent is extended or adjusted under 35 U.S.C. 154(b) by 0 days.

This patent is subject to a terminal disclaimer.

(21) Appl. No.: 18/097,134

(22) Filed: Jan. 13, 2023

Related U.S. Application Data (63) Continuation of application No. 16/153,015, filed on Oct. 5, 2018, now Pat. No. 11,557,951.

(60) Provisional application No. 62/569,009, filed on Oct. 6, 2017.

(51) Int. Cl.
| | |
|---|---|
| *H02K 21/38* | (2006.01) |
| *H02K 1/17* | (2006.01) |
| *H02K 1/22* | (2006.01) |
| *H02K 3/02* | (2006.01) |
| *H02K 11/01* | (2016.01) |
| *H02K 21/42* | (2006.01) |

(52) U.S. Cl.
CPC ............ *H02K 21/38* (2013.01); *H02K 1/17* (2013.01); *H02K 1/22* (2013.01); *H02K 3/02* (2013.01); *H02K 11/01* (2016.01); *H02K 21/42* (2013.01)

(58) Field of Classification Search
CPC .......... H02K 21/38; H02K 1/17; H02K 1/22; H02K 3/02; H02K 11/01; H02K 21/42
See application file for complete search history.

(56) References Cited

U.S. PATENT DOCUMENTS

| | | | |
|---|---|---|---|
| 3,564,307 A | 2/1971 | Kawabe et al. | |
| 3,745,388 A | 7/1973 | Frederick | |
| 3,911,301 A * | 10/1975 | Riley | B41J 29/38 |
| | | | 310/168 |
| 3,983,430 A | 9/1976 | Howard | |
| 4,217,512 A | 8/1980 | Hauler et al. | |
| 4,503,348 A * | 3/1985 | Esper | H02N 11/004 |
| | | | 310/155 |
| 5,691,683 A * | 11/1997 | Allwine, Jr. | H02K 3/04 |
| | | | 335/302 |

(Continued)

OTHER PUBLICATIONS

Feasibility Study of Rotating Shield Generator, Aug. 2005 (Year: 2005).

(Continued)

*Primary Examiner* — Bernard Rojas
(74) *Attorney, Agent, or Firm* — Fish & Richardson P.C.

(57) ABSTRACT

A generator for generating energy is described. The generator includes a first shielding disk having alternating first disk regions of magnetic shielding and non-shielding. One or more conductive wires are located axially below the first shielding disk. Each conductive wire has one end that crosses through a first disk region of magnetic shielding. The generator also includes a first magnet located axially above the first shielding disk such that a first pole is of the first magnet is directed towards the first shielding disk and the conductive wire and a second magnet located axially above the first shielding disk such that a second pole is of the second magnet is directed towards the first shielding disk. The second pole is opposite the first pole of the first magnet. Methods of using the generator are also described.

12 Claims, 7 Drawing Sheets

(56) References Cited

U.S. PATENT DOCUMENTS

| | | |
|---|---|---|
| 8,120,225 B2 | 2/2012 | Thundat et al. |
| 2010/0026129 A1 | 2/2010 | Black, Jr. |
| 2011/0057822 A1* | 3/2011 | Watahiki .................. G01D 5/36 |
| | | 250/231.13 |
| 2011/0115327 A1 | 5/2011 | Pan |
| 2015/0364979 A1 | 12/2015 | Annis |
| 2016/0301290 A1 | 10/2016 | Sakiyama et al. |
| 2019/0027988 A1 | 1/2019 | Filipenko et al. |

OTHER PUBLICATIONS

Machine Translation of JP-2004282855-A, Ono, Hisami (Year: 2004).

Machine Translation of WO-2010130216-A1, Ying Te-Kue I (Year: 2010).

* cited by examiner

SHIELD GENERATOR

CROSS-REFERENCE TO RELATED APPLICATIONS

This is a continuation of U.S. application Ser. No. 16/153,015, filed on Oct. 5, 2018, which claims priority to U.S. Provisional Application No. 62/569,009, filed on Oct. 6, 2017. The disclosures of the prior applications are considered part of and are incorporated by reference in the disclosure of this application.

BACKGROUND

Various embodiments relate generally to power productions systems, methods, and devices and, more specifically, relate to alternating current power generation.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Standard electromagnetic power generation systems rely on basic principles which have changed little from their original conception in the early 1800's by Michael Faraday. These systems use a motor having a stationary stator and a rotating rotor. By placing a magnet on the rotor and a conductive coil on the stator (or visa-versa), rotating the rotor subjects the coil to a changing magnetic field in order to induce electricity.

What is needed is a system which provides additional efficiencies.

SUMMARY

The below summary is merely representative and non-limiting.

The above problems are overcome, and other advantages may be realized, by the use of the embodiments.

In a first aspect, an embodiment provides a generator for generating energy. The generator includes a first shielding disk having alternating first disk regions of magnetic shielding and non-shielding. One or more conductive wires are located axially below the first shielding disk. Each conductive wire has one end that crosses through a first disk region of magnetic shielding and a second end that crosses through a first disk region of non-shielding. The generator also includes a first magnet located axially above the first shielding disk such that a first pole is of the first magnet is directed towards the first shielding disk and the conductive wire and a second magnet located axially above the first shielding disk such that a second pole is of the second magnet is directed towards the first shielding disk. The second pole is opposite the first pole of the first magnet.

In another aspect, an embodiment provides for generating energy. The method includes providing a generator that generator includes a first shielding disk having alternating first disk regions of magnetic shielding and non-shielding. One or more conductive wires are located axially below the first shielding disk. Each conductive wire has one end that crosses through a first disk region of magnetic shielding. The generator also includes a first magnet located axially above the first shielding disk such that a first pole is of the first magnet is directed towards the first shielding disk and the conductive wire and a second magnet located axially above the first shielding disk such that a second pole is of the second magnet is directed towards the first shielding disk. The second pole is opposite the first pole of the first magnet. The method also includes rotating the first shielding disk; and collecting energy from the conductive wire.

DESCRIPTION OF DRAWINGS

Aspects of the described embodiments are more evident in the following description, when read in conjunction with the attached Figures.

DETAILED DESCRIPTION

Various embodiments replicate the interaction of a conductor moving within a two-pole magnetic field set, or vice versa, just like contemporary generators. However, these embodiments avoid inefficiencies due to the rotation of either magnets or conductive wires.

Rather, various embodiments rotate a plurality of shielding elements between stationary magnets and stationary conductors in order to induce electricity within the conductors. By rotating only the relatively lighter weight disks of shielding elements, there is a reduced rotational speed requirement as compared to a motor's rotor. Furthermore, by increasing the number of conductors and magnets the same rotating shielding disk may be used to induce electricity in multiple wires simultaneously. This provides a greater efficiency with minimal mechanical effort.

Additionally, the reduced rotational speed enables the practical use of large scale shielding disks. This allows the shielding motor to be considerably larger than conventional energy production motors. By increasing the size of the shielding motor, it may include more conductors and magnets to further improve efficiency.

Figure 1:
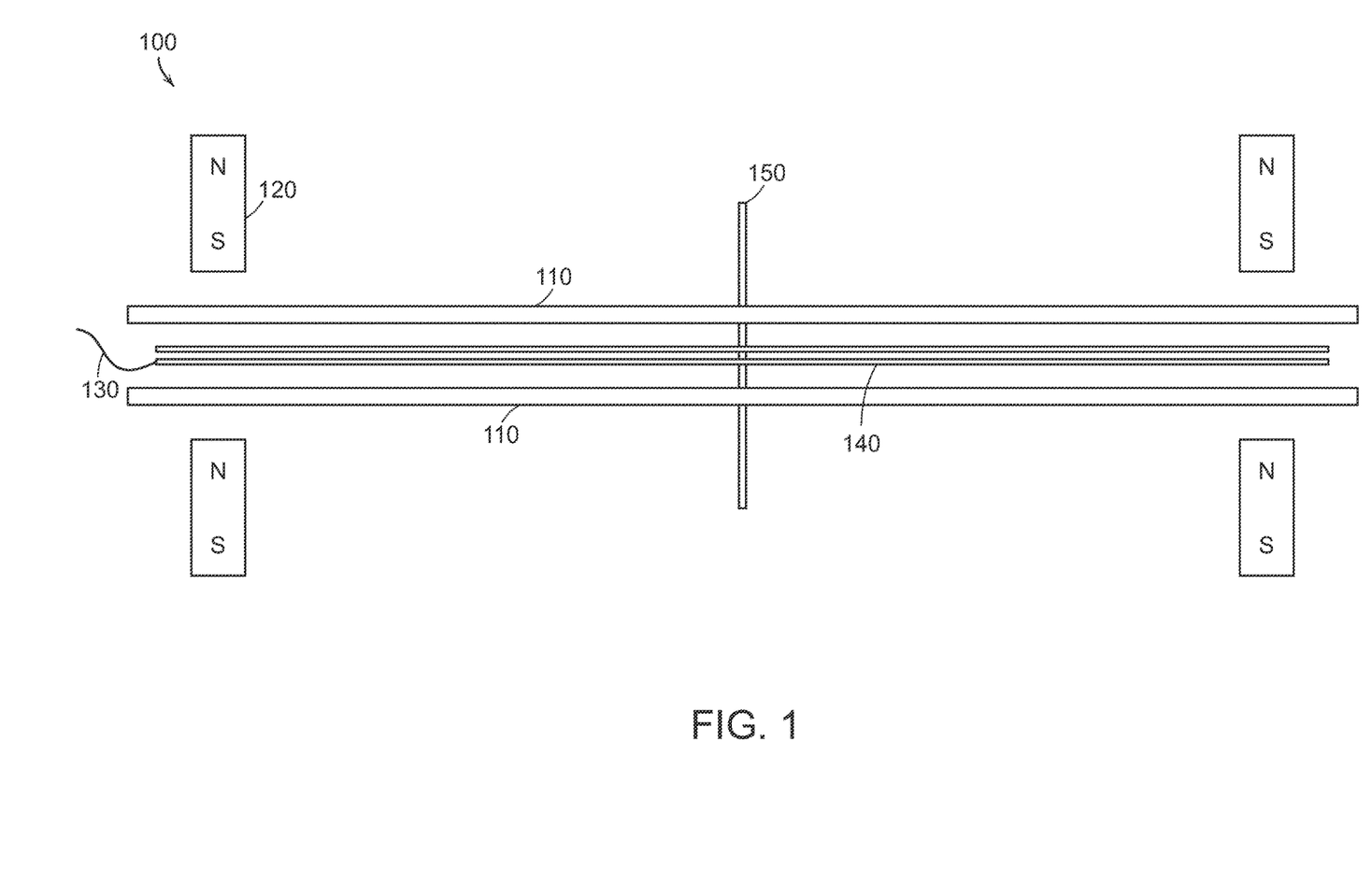
FIG. 1 shows a side view of a simplified block diagram of a device that is suitable for practicing various embodiments.

FIG. 1 shows a side view of a simplified block diagram of a device 100 that is suitable for practicing various embodiments. The top side of the paired magnets 120 and paired shielding disks 110 is shown above a coil 140. A second set of magnets 120 and a second shielding disk 110 is present below the conductive bar (also as shown in FIGS. 3-6 and 9). The top disk 110 is located between the top magnets 120 and the coil 140. The bottom disk 110 is located opposite the top disk 110 between the coil 140 and bottom magnets 120. These disks 110 are able to rotate around the axis 150 between the magnets 120 and coils 140 which may be held relatively stationary.

In one non-limiting embodiment, the coil 140 may be replaced, at least in part, with a conductive bar or other conductive element.

Figure 2:
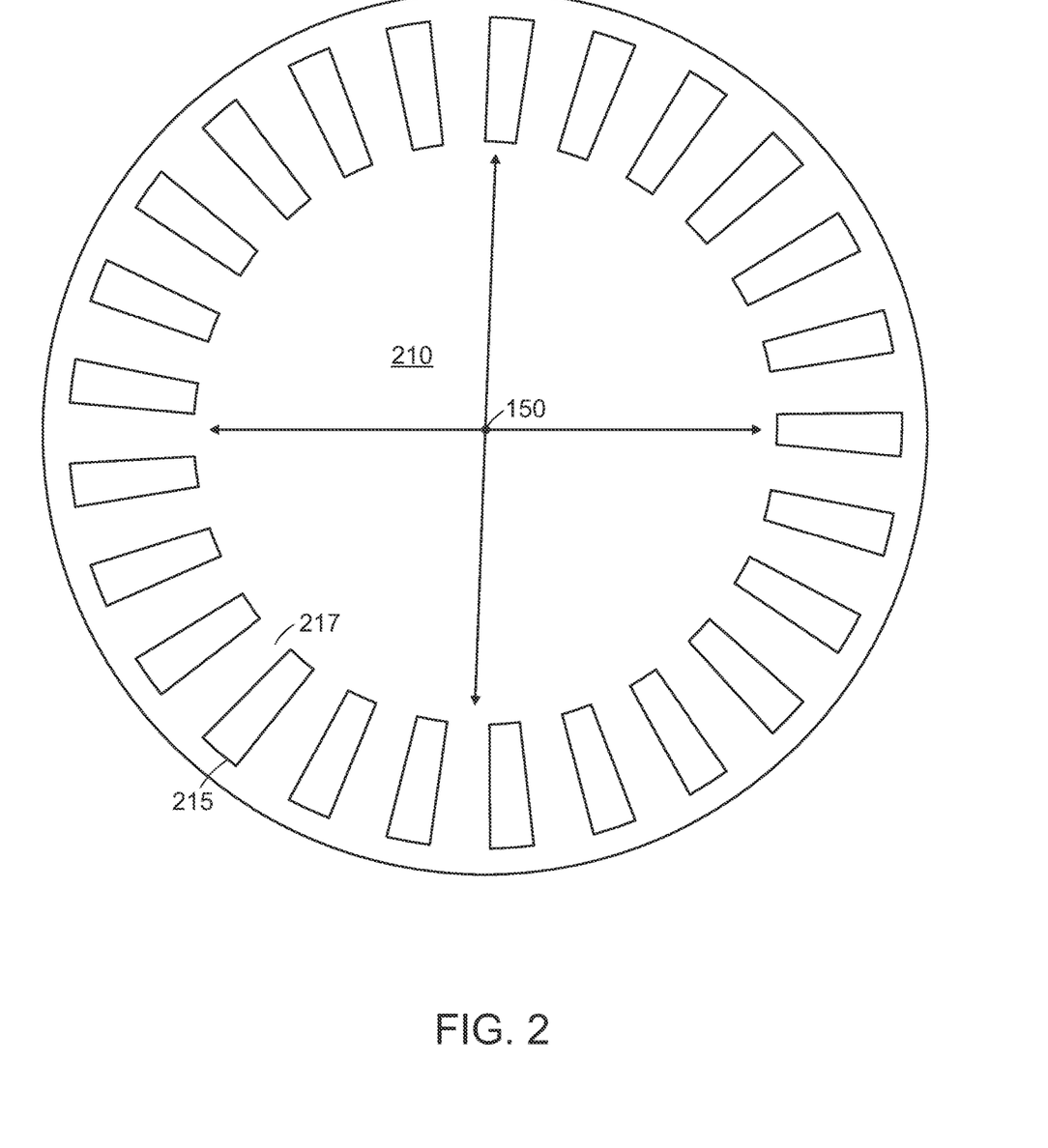
FIG. 2 shows a simplified block diagram of a shielding disk for use in an embodiment.

FIG. 2 shows a simplified block diagram of a shielding disk 210 for use in an embodiment. The shielding elements 215 are arranged on lightweight disks 210 in an orientation such that there is an open space 217 directly across from each element 215 (e.g., 1800 around the disk 210 from each other). As shown, there are an equal number of open spaces 217 as elements 215 and they are the same size. As shown, the shielding elements 215 may be sized so as to cover a limited radial distance where the magnetic fields are able to interact with the conductive wire 140. The shielding elements 215 may be made of any suitable material which can obstruct the magnetic flux.

In an alternative embodiment, the size of the shielding elements 215 may be more or less than the size of the non-shielding areas 217 so as to provide zones where either the top shielding 215 overlaps with the bottom shielding 215 or the top and bottom non-shielding areas 217 overlap.

In further embodiments, the shielding disk 210 may have cut-outs to reduce its weight. In another embodiment, the shielding disk may include spokes radiating out of a central hub. Each shielding element 215 may be located on one or more individual spokes or they may be located on an annulus connected to the spokes.

Figure 3:
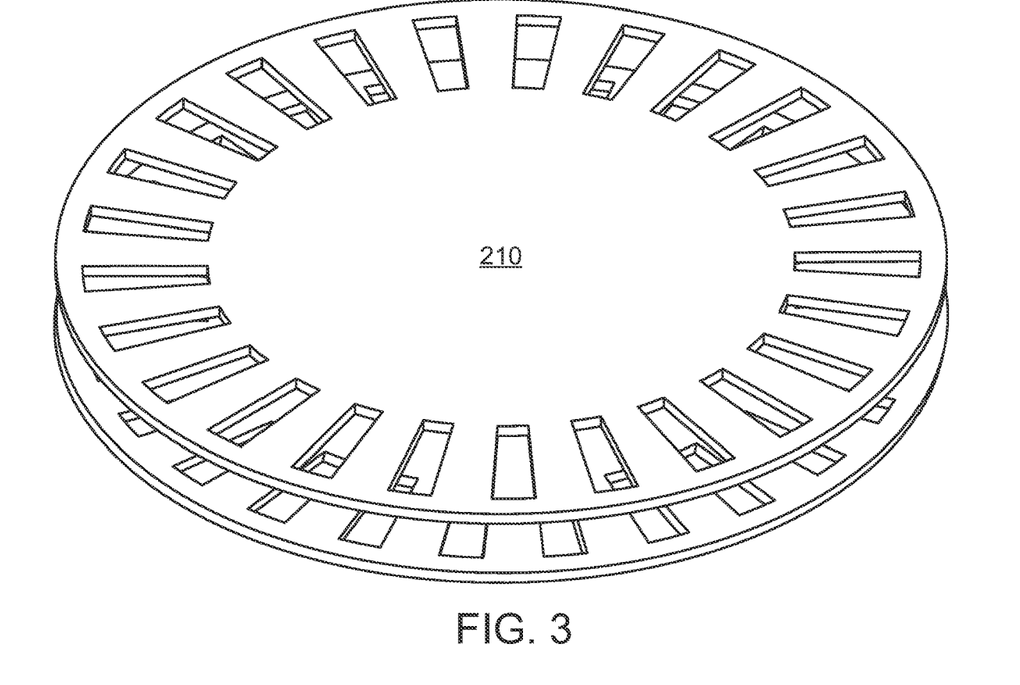
FIG. 3 shows a simplified block diagram of a pair of shielding disks for use in an embodiment.

FIG. 3 shows a simplified block diagram of a pair of shielding disks 210 for use in an embodiment. Two shielding disks 210 are connected by way of their axel (not shown). They are fixed relative to each other and are offset such that when viewed from above or below it would appear that there was an entire ring of both shielding and empty space. The offset is the width of the shielding elements 215 (which is equal to the width of the open spaces 217).

Figure 4:
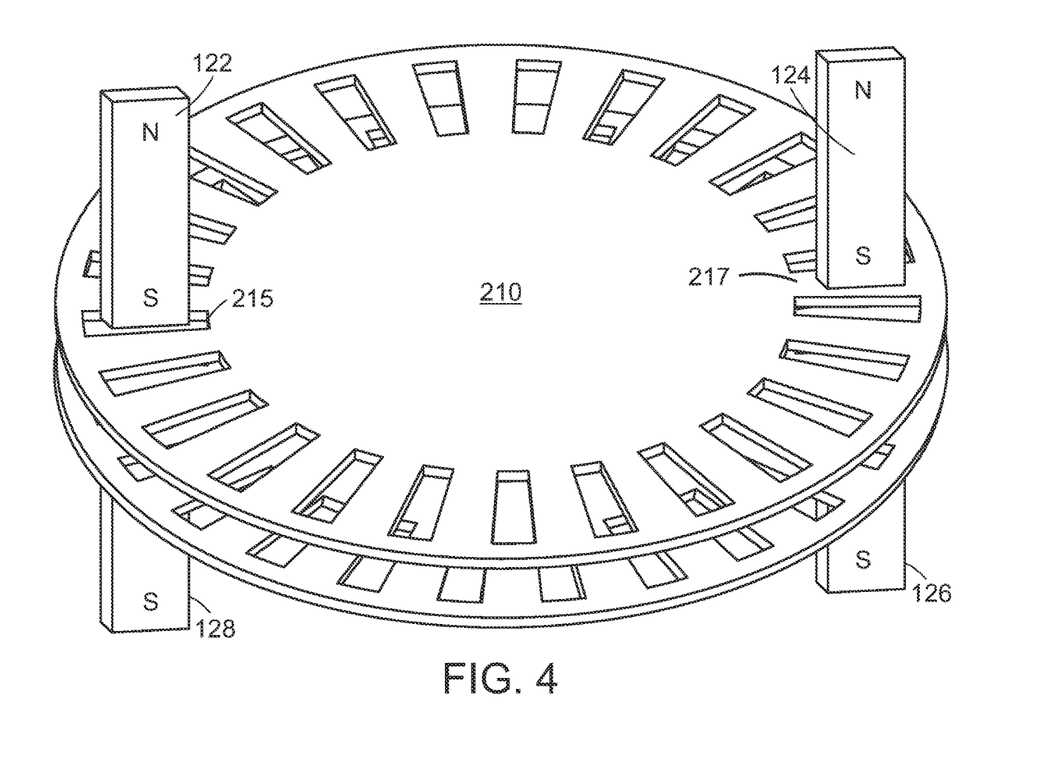
FIG. 4 shows a simplified block diagram of paired magnets and a pair of shielding disks for use in an embodiment.

FIG. 4 shows a simplified block diagram of paired magnets 122, 124, 126, 128 and a pair of shielding disks 210 for use in an embodiment. The shield disks 210 and magnets 122, 124, 126, 128 interact in the same manner for each coil, simultaneously. At each end of the coil, one field is shielded by shielding element 215 while one is open 217, as the disks 210 rotate the coil is exposed to alternating fields. The coil (not shown) is located between the disks 210.

Figure 5:
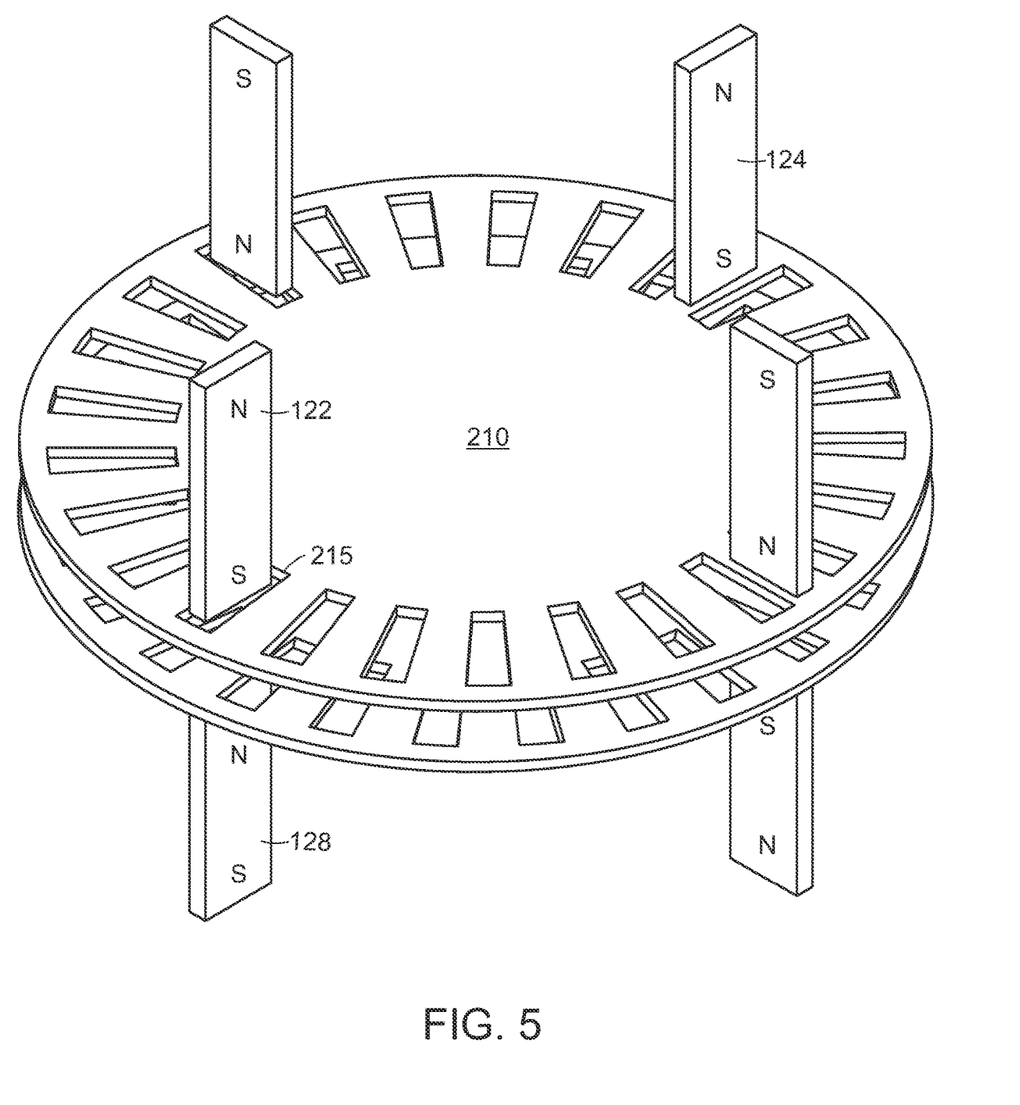
FIG. 5 shows a simplified block diagram of four sets of paired magnets and a pair of shielding disks for use in another embodiment.

FIG. 5 shows a simplified block diagram of four sets of paired magnets 122, 124, 126, 128 and a pair of shielding disks 210 for use in another embodiment. The coils can be provided in pairs, such that there is always an even number, to allow for alternating field exposure to prevent saturation, in this example, there would be two coils (not shown). As shown, the magnets 122, 124, 126, 128 are spaced around a central axis. In comparison, conventional generators operate using a single magnet or a single pair of magnets for each inductive region. Such arrangements risk saturating any shielding present such that the shields become extremely inefficient. In the shield generator described, the matched sets of magnets ensure the shielding elements 215 are subjected to opposite magnetic fields in order to counteract any saturation.

Figure 6:
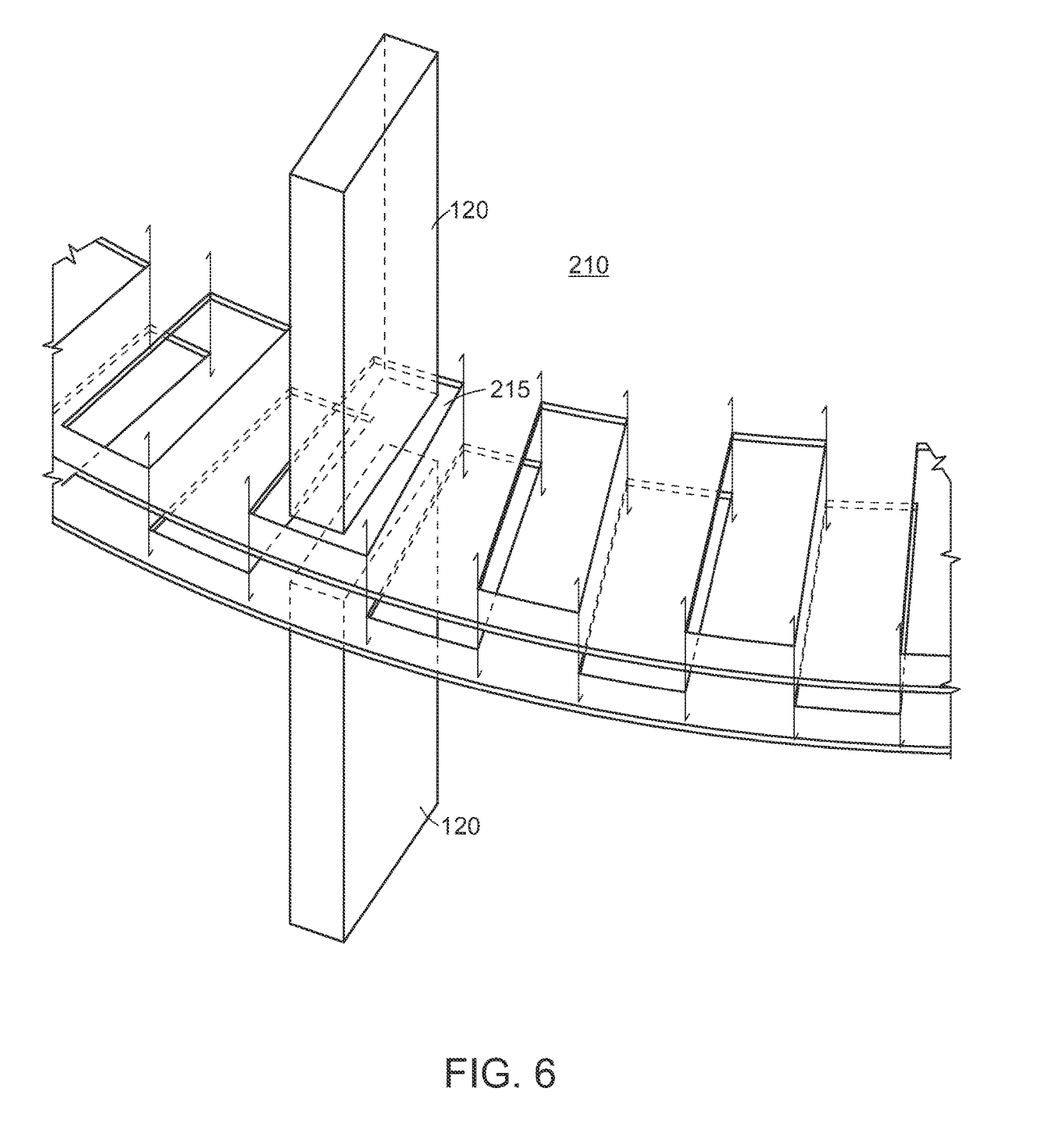
FIG. 6 shows a close-up view of one set of paired magnets and the pair of shielding disks for use in an embodiment.

FIG. 6 shows a close-up view of one set of paired magnets 120 and the pair of shielding disks 210 for use in an embodiment. The top magnet of the pair of magnets 120 is fully shielded by a shielding element 215 while the bottom magnet 120 is completely unshielded. In this position, a first end of the coil (not shown) is exposed to only the field from the bottom magnet 120 while the other end would be exposed to only the field from the top magnet (not shown). As the disks 210 rotate, the field from the bottom magnet 120 is shielded and the field from the top magnet 120 is unshielded so that the first end is then exposed to the field from the top magnet 120. As the disks 210 rotate further the magnetic fields return to the original magnitude due to the field from the bottom magnet 120 being unshielded and the field from the top magnet 120 shielded so that the first end is again exposed to the field from the bottom magnet 120.

The width of the shielding elements 215 and non-shielding regions 217 may be selected based on the operational rotation speed of the shielding disks 210. In some, non-limiting embodiments, the selected width ensures the induced energy in the conductive coil is sinusoidal. In such embodiments the energy in the conductive coil is at its maximal magnitude when one of the magnets 120 (e.g., the top magnet) is fully obscured and the other magnet 120 (e.g., the bottom) is fully exposed. As the shielding disks rotate 210 past this point, the magnitude drops as the top magnet 120 is exposed and the lower magnet 120 is obscured until the energy reaches its minimal magnitude as the top magnet 120 is fully exposed and the lower magnet 120 is fully obscured. This pattern repeats for each pair of shielding 215/non-shielding regions 217 in the shielding disks 210 passes between the magnets 120 and conductive coil.

Figure 7:
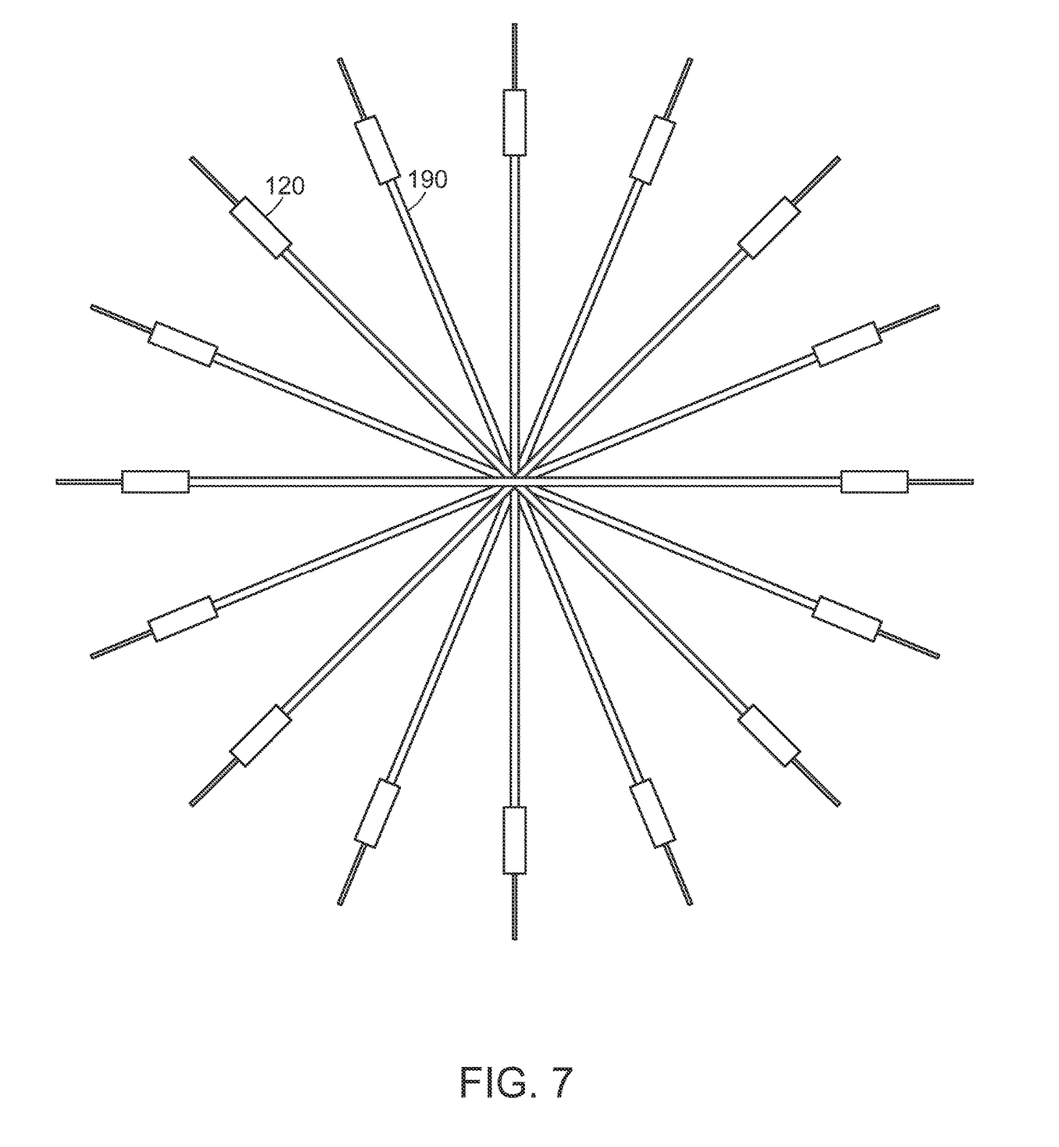
FIG. 7 illustrates a plurality of conductive wires for use in an embodiment.

FIG. 7 illustrates a plurality of conductive wires 910 and magnets 120 for use in an embodiment. The eight (8) conductive wires 910 extend through associated inductive regions, regions where the magnetic fields from magnets 120 are allowed to induce a current in the conductive wire 910. Within the regions, the magnetic fields are altered by the rotation or spinning of the shielding disk 210 which generates the electricity. When assembled, the conductive wires 910 of FIG. 7 pass between the magnets 120 with a shielding disk 210 between the conductive wires 910 and the magnets 120, similar to as shown in FIG. 1.

In a further embodiment, the conductive wires 910 may be arranged with another material, such as a non-conductive frame or substrate. The conductive wires may also describe non-linear paths between opposite inductive regions, for example, in order to route around an axel used to rotate the shielding disks 210.

Figure 8:
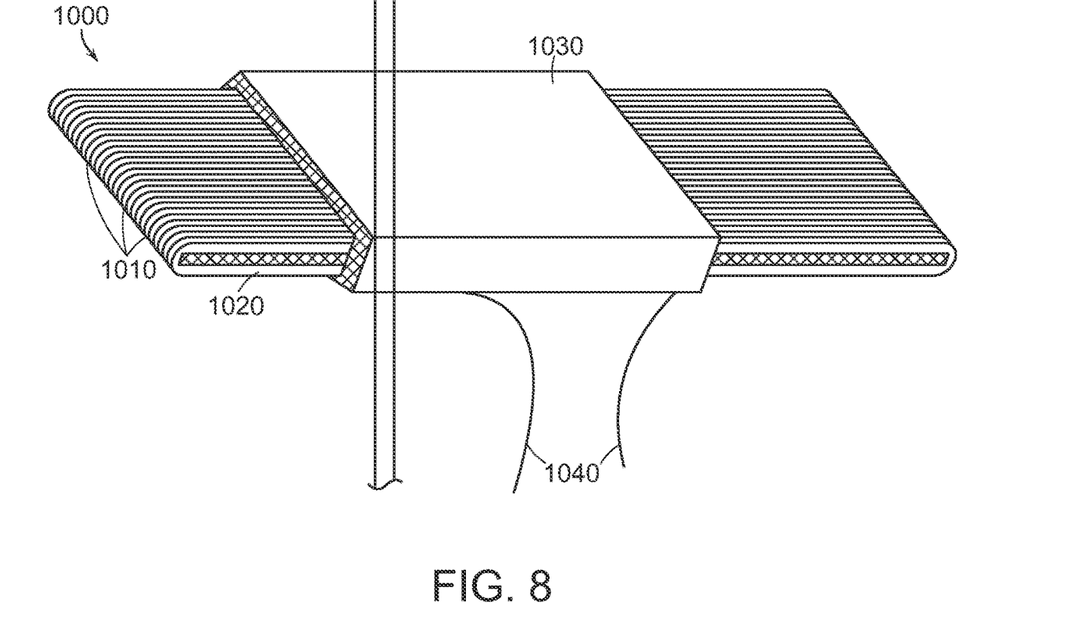
FIG. 8 shows a simplified block diagram of copper coils used in an embodiment.

FIG. 8 shows a simplified block diagram of copper coils 1010 used in an embodiment of the conductive wires 1000. The coil 1010 is formed by winding copper wire around a rubber or similar flexible non-conductive material. It may be insulated in the regions that do not interact with any magnets.

As shown, the coil 1010 includes a conductive wire which is wrapped in parallel around a rubber strip 1020. In this non-limiting embodiment, the coils 1010 are arranged perpendicular to a tangent of the disk 210. In an alternative embodiment, the coils 1010 may be arranged parallel to the tangent of the disk 210.

The coils 1010 may be limited in size to the inductive regions between the pairs of magnets 120. Additionally, the leads 1040 may be located at any point on the coil 140. As one non-limiting example, the leads 130 may be located at opposite ends of the coil 140, such as shown in FIG. 1. The leads may instead be located at the same end of the coil or near an axis of rotation.

In another embodiment, the coils may include a conductive material other than copper, such as silver, gold, or palladium; and/or another conductive substance such as a super-conductor.

Figure 9:
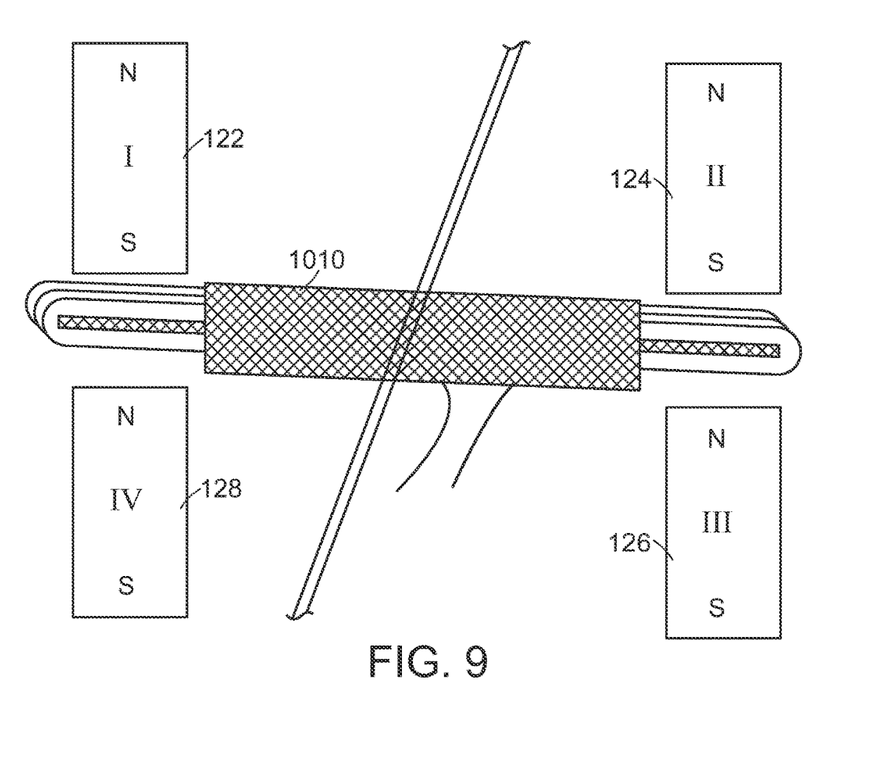
FIG. 9 shows a simplified block diagram of magnets and copper coils used in an embodiment.

FIG. 9 shows a simplified block diagram of magnets 122, 124, 128, 126 and copper coils 1010 used in an embodiment of the shield generator. The magnets 122, 124, 128, 126 and coils 1010 are fixed in place and shielding disks (not shown) located between the magnets 122, 124, 128, 126 and coils 1010 are rotated. The magnets 122, 124, 128, 126, here shown as a set of two pairs of opposing poled magnets at each end, for example, magnets I 122 and IV 128 are one pair and the magnets II 124 and III 126 are a second pair.

Alternating current is induced in the coils 1010 by rotation of the shielding disks. As the disks rotate the effective field, that which is felt by the coil, switches polarity. In the first position magnets I 122 and III 126 are shielded while II 124 and IV 128 are open. As the disks rotate I 122 and III 126 begin to open while II 124 and IV 128 begin to close equally. Once I 122 and III 126 are completely open II 124 and IV 128 would be completely closed completing a cycle. It is important to note that in this orientation a cycle is completed with just a small bit of rotation, the distance of an element and open space. The coil 1010 would undergo the exact same magnetic forces as a coil 1010 making a full rotation in a traditional turbine.

With a shield generator in accordance with one, non-limiting embodiment each full rotation of the shielding disks creates as many cycles as there are shielding elements on the disks, potentially a hundred (100) or more. As noted earlier there would be at least two coils but more likely four (4) or more, each producing power from the same physical work. Due to much lower rotational speed, larger coils and magnets and disks could be used.

Shielding disks could be manufactured in such a way as to be lighter than either magnets or coils and thus require less physical work to spin. Overall efficiency would be improved by greater than two (2) magnitudes, that is, the same physical work will produce hundreds of times the power with a shield generator than it would with a traditional model.

A shield generator as described above can produce alternating current (AC) having a sinusoidal wave at 60 Hz by rotating the shielding disks at 30 rotations per minute. In contrast, conventional generators may require considerably high rotational speeds, for example, over 3000 RPM.

Many conventional generators may also have difficulty producing 'clean' sinusoidal waves. Such power generation may require additional electronics in order to make the proper waveform from the wave provided. Such waves may include only half the sinusoidal waveform (e.g., the positive half) and/or the wave may be clipped and plateaus.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A generator comprising:
    a first shielding disk and a second shielding disk separated along an axis by a space and configured to rotate around the axis, each shielding disk having alternating regions of magnetic shielding and non-shielding arranged a common radial distance from the axis, each region of magnetic shielding on the first shielding disk being azimuthally-aligned with a region of non-shielding on the second shielding disk
    a pair of magnets disposed in a stationary position with respect to the axis, the pair of magnets comprising:
        a first magnet located axially above the first shielding disk with a first pole of the first magnet facing the first shielding disk; and
        a second magnet located axially below the second shielding disk at the same azimuthal position as the first magnet with a second pole of the second magnet facing the second shielding disk; and
    a conductive wire arranged in the space between the first shielding disk and the second shielding disk, the conductive wire comprising a coil with a plurality of windings extending back and forth across the axis.

2. The generator of claim 1, wherein during operation the generator produces alternating current having a sinusoidal wave at 60 Hz.

3. The generator of claim 2, wherein the generator produces the alternative current by rotating the first and second shielding disks at 30 rotations per minute.

4. The generator of claim 1, wherein for each of the shielding disks, each region of magnetic shielding is an equal size to the paired region of non-shielding.

5. The generator of claim 1, wherein for each of the shielding disks, each region of magnetic shielding is smaller than the paired region of non-shielding.

6. The generator of claim 1, wherein the first shielding disk comprises at least one hundred regions of magnetic shielding.

7. The generator of claim 1, wherein the first shielding disk comprises a disk of a non-shielding disk material, and each region of magnetic shielding comprises a magnetic shielding element embedded in the disk material.

8. The generator of claim 1, wherein the first shielding disk comprises a plurality of spokes.

9. The generator of claim 8, wherein the first shielding disk further comprises an annulus supported by the plurality of spokes, wherein the regions of magnetic shielding and non-shielding are located on the annulus.

10. The generator of claim 8, wherein each region of magnetic shielding comprises a magnetic shielding element disposed on at least one associated spoke of the plurality of spokes.

11. The generator of claim 1, wherein the conductive wire comprises at least one of: copper, gold, and palladium.

12. The generator of claim 1, wherein the conductive wire comprises a super-conductor.

* * * * *